United States Patent

[11] 3,569,864

[72] Inventor Igor Scherrer
Colombier, Switzerland
[21] Appl. No. 789,205
[22] Filed Jan. 6, 1969
[45] Patented Mar. 9, 1971
[73] Assignee S. A. Ebauches
Neuchatel, Switzerland

[54] ASTABLE TRANSISTOR MULTIVIBRATOR FREQUENCY DIVIDER
2 Claims, 2 Drawing Figs.

[52] U.S. Cl. ........................................ 331/113, 307/225, 321/60, 325/39, 325/201, 331/145, 331/172
[51] Int. Cl. ........................................ H03k 3/282, H03k 21/00
[50] Field of Search ........................................ 331/51, 52, 11 (B), 145, 172, 173; 321/60, 65, 69; 328/39, 201; 307/225

[56] References Cited

UNITED STATES PATENTS

| | | | |
|---|---|---|---|
| 2,572,698 | 10/1951 | Canfora | 331/51 |
| 3,037,171 | 5/1962 | Cerofolini | 331/113X |
| 3,377,569 | 4/1968 | Mothersole | 331/145 |

*Primary Examiner*—John Kominski
*Assistant Examiner*—Siegfried H. Grimm
*Attorney*—Kenwood Ross

ABSTRACT: A frequency divider is formed by an astable transistorised multivibrator of symmetrical construction comprising two parts. Rectangular input signals are applied symmetrically and in opposite phase to each part, and fed to the emitters of the transistors through a respective input capacitor. The multivibrator is a relaxation oscillator consisting of two NPN transistors coupled through two capacitors, so that the input of one transistor is actuated through the respective capacitor, by the output of the other transistor. The input signals may be supplied by an identical multivibrator.

INVENTOR.
Igor SCHERRER
BY Kenwood Ross
ATTORNEY.

ASTABLE TRANSISTOR MULTIVIBRATOR FREQUENCY DIVIDER

The present invention relates to a frequency divider.

An important class of frequency dividers uses the property that any oscillator has, to a greater or less degree, or being synchronizable by an external signal of which the frequency is a whole multiple of the frequency of the oscillator.

The external signal has, in general, the form of pulses and its action consists of replacing the oscillator in phase, at the end of each period of oscillation of the latter.

It is an object of the present invention to provide a frequency divider in which the oscillator is synchronized every half-period.

Other objects and advantages will emerge from the description which follows.

The frequency divider according to the invention is characterized by the fact that it is constituted by an oscillator of symmetrical construction into each part of which are sent input signals, these signals being symmetrical and of opposite phase, the whole being arranged so that the oscillator is synchronized every half-period.

As a result, in the present frequency divider, the restoration into phase of the oscillator is effected at each half-period and not at each whole period of oscillation as in known frequency dividers. Through this fact, all other things being equal, there is obtained double the division factor for the same safety of operation.

Figure 1:
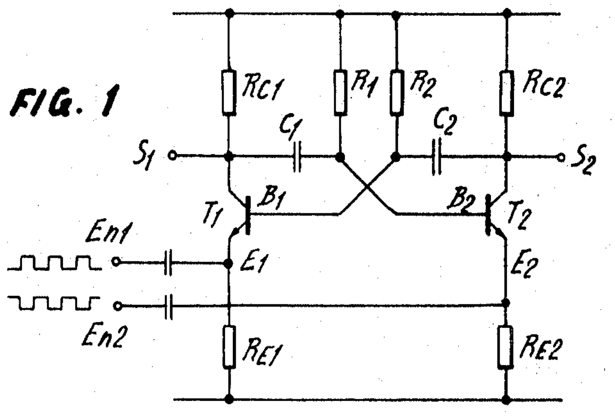
Figure 2:
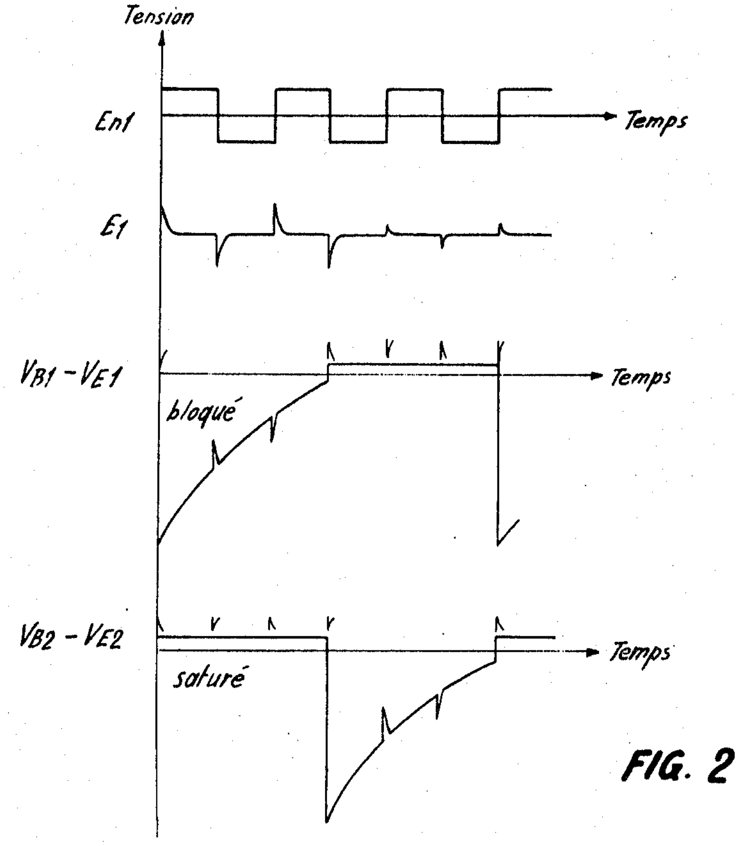

In order that the invention may be more fully understood one embodiment of a frequency divider according to the invention is described below, purely by way of illustrative but nonlimiting example, with reference to the accompanying drawings, in which:

FIG. 1 shows the diagram of an astable transistorized multivibrator of a frequency divider according to the invention; and FIG. 2 is a diagram of the voltage as a function of time, of the frequency divider of FIG. 1, for a division factor of 3.

Referring to the drawings, the astable multivibrator shown in FIG. 1 is a relaxation oscillator constituted by two active elements, here NPN transistors T1 and T2, coupled to one another through capacities C1 and C2, so that the input of one is actuated through the condenser C1, and C2 respectively, by the output of the other.

When one of the active elements is blocked, the other is conductive. The swing from one state to the other is produced by the charge of the condenser C1, and C2 respectively, through a resistance R1, and R2 respectively, which cause the control voltage of the blocked element to rise, that is to say the base-emitter voltage of the blocked transistor at the moment when it commences to conduct. The coupling of the two transistors constitutes a positive reaction, the phenomenon is cumulative, that is to say that the increase in current in one of the transistors causes a reduction in the other, and inversely. The oscillation is hence very rapid.

This multivibrator is synchronized by two rectangular signals shown in the left-hand part of the figure, of opposite phase, applied to inputs $E_{n1}$ and $E_{n2}$. These rectangular signals are differentiated by the input capacitators CE1 and CE2 respectively, and the short pulses, produced on the right vertical sides of the input signals, are added to the exponential variation due to the charge of the capacities C2 and C1 respectively, of the multivibrator.

The moment of swing, at the time when the base-emitter voltage of the blocked transistor reaches the threshold of conduction, is determined precisely by the output pulse of the control signal, which ensures synchronization of the multivibrator.

There are collected, on the collectors of the two transistors $T_1$ and $T_2$, namely at $S_1$ and $S_2$, signals also rectangular and of opposite phase, which enable the driving of another multivibrator identical with that which is shown.

The diagram of voltages of FIG. 2 indicates the applied signal at $E_{n1}$, the voltage at $E_1$ on the emitter of the transistor $T_1$, then the base-emitter voltage $V_{B1}$ -$V_{E1}$ of the transistor $T_1$ and finally the base-emitter voltage $V_{B2}$ -$V_{E2}$ of the transistor $T_2$.

It is especially important to consider the base-emitter voltage of the blocked transistor, for it is the positive pulse at the end of each half-period which causes the multivibrator to swing and thus replace it in phase.

It is seen, by referring to FIG. 2, that at each half-period, there is a pulse $V_B$-$V_E$>0 for the blocked transistor and a pulse $V_B$-$V_E$<0 for the saturated transistor.

These two effects are added, the first being more effective than the second, which leads to a very easy synchronization, the situation remaining the same for any odd number taken as factor of division.

It is to be noted that it is advantageous to apply the input pulses on the transistor emitters rather than on their bases. In fact, in the blocked condition of the transistors, the pulses are only damped by the resistance $R_E$, while in the saturated state of the transistors, the output resistance of the transistor, seen from the emitter, is very weak, so that the pulses are very strongly damped and have practically no effect.

Such a separation is no longer produced if the input is made on the bases, so that operation, although possible, is then more delicate.

Finally, it should be pointed out that a division by an even number is not possible.

In fact, in that case, it would only be at the end of each period that the pulses would be of the desired polarity, while at the half-period the blocked transistor would receive a pulse $V_B$-$V_E$<0 and the saturated transistor a pulse $V_B$-$V_E$>0. The effect would hence be worse, for good operation, than the absence of pulses at the half-period.

It will be apparent that various changes and modifications may be made in the embodiment described without departing from the essential concept of the invention as defined in scope by the appended claims.

I claim:

1. An astable transistor multivibrator frequency divider comprising:
   a two-part relaxation oscillator of symmetrical construction for the application of rectangular input signals to each part, the input signals being rectangular signals applied symmetrically and in opposite phase to the emitters of the transistors, the two transistors being coupled through two capacitors, so that the input of one transistor is actuated through the respective capacitor by the output of the other transistor, the oscillator being synchronized every half-period.

2. The frequency divider according to claim 1, the multivibrator including two input capacitators arranged to differentiate the rectangular input signals.